United States Patent [19]

Miller et al.

[11] 4,402,932

[45] Sep. 6, 1983

[54] THERMAL DECOMPOSITION OF ALUMINUM CHLORIDE HEXAHYDRATE

[75] Inventors: Eugene Miller, Incline Village, Nev.; Gerald B. McSweeney, DuPont, Wash.

[73] Assignee: The United States of America as represented by the Secretary of the Interior, Washington, D.C.

[21] Appl. No.: 376,066

[22] Filed: May 7, 1982

[51] Int. Cl.$^3$ .............................................. C01F 7/30
[52] U.S. Cl. ........................... 423/625; 423/DIG. 16; 423/481
[58] Field of Search ....................... 423/625, DIG. 16

[56] References Cited

U.S. PATENT DOCUMENTS

| | | | |
|---|---|---|---|
| 4,080,437 | 3/1978 | Reh et al. | 423/DIG. 16 |
| 4,091,085 | 5/1978 | Reh et al. | 423/625 |
| 4,159,313 | 6/1979 | Mercier et al. | 423/625 |
| 4,226,844 | 10/1980 | Reh et al. | 423/DIG. 16 |
| 4,259,311 | 3/1981 | Shah | 423/625 |

*Primary Examiner*—Herbert T. Carter
*Attorney, Agent, or Firm*—William S. Brown

[57] ABSTRACT

Aluminum chloride hexahydrate is thermally decomposed to alumina by sequential treatment in two dense fluidized-bed decomposers, the first decomposer being operated at a temperature of about 200° to 400° C. and the second at a temperature of about 900° to 1100° C. About 90 to 95 percent decomposition is achieved in the first decomposer, with substantially complete decomposition of the remainder in the second decomposer. Fluidization in the first decomposer is preferably achieved by means of recycle of product gases.

2 Claims, No Drawings

THERMAL DECOMPOSITION OF ALUMINUM CHLORIDE HEXAHYDRATE

This invention relates to a process for thermal decomposition of aluminum chloride hexahydrate to alumina, the process being a key step in production of cell-grade alumina from kaolin using hydrochloric acid as a leaching agent.

Extraction of aluminum from clays by leaching with mineral acids, particularly hydrochloric acid, is well known. Aluminum chloride hexahydrate, $AlCl_3.6H_2O$, is conventionally crystallized from the leach liquors, and subsequently thermally decomposed to form alumina according to the reaction:

$$2AlCl_3.6H_2O \rightarrow Al_2O_3 + 9H_2O + 6HCl.$$

Fluidized-bed processes have been employed for decomposition of the $AlCl_3.6H_2O$, as shown, e.g., in U.S. Pat. No. 4,080,437. However, such processes have generally been inefficient, particularly from the standpoint of energy consumption.

It has now been found, according to the present invention, that the efficiency of thermal decomposition of $AlCl_3.6H_2O$ may be substantially improved by means of a process employing two dense fluidized-bed decomposers in series, with the first stage decomposer being operated at a relatively low temperature to partially decompose the $AlCl_3.6H_2O$, and the second stage decomposer operating at a higher temperature to essentially complete the decomposition of the $AlCl_3.6H_2O$. In addition, it has been found that the efficiency of the decomposition process may be still further improved by utilizing gaseous decomposition products, i.e., HCl and steam, from the first stage decomposer as fluidization gases in said decomposer. For this purpose, the product gases are recycled by means of suitable conventional apparatus, such as a combination of blower and damper valve, to the fluidizing gas inlet in the first stage decomposer. Gases in excess of those required for fluidization are transferred to a condenser where they are recovered as concentrated hydrochloric acid for recycle to the initial leaching step, for washing $AlCl_3.6H_2O$ crystals from the crystallizer, or for use as a source of sparging gas for the crystallizer. This direct recovery of concentrated hydrochloric acid avoids the high energy and equipment costs of recovery of concentrated acid from the dilute gases formed in prior art processes.

The $AlCl_3.6H_2O$ feed is preferably dried to a moisture content of about 2 to 3 wt. pct. before introduction to the first stage decomposer in order to facilitate feeding of the crystals. This is readily accomplished by conventional means such as a fluid bed dryer, preferably at a temperature of about 90° to 110° C. Particle size of the feed should range from about −30 to +325 mesh. Optimum feed rate of the $AlCl_3.6H_2O$ to the first stage decomposer will depend on the dimensions of the decomposer, height and density of the fluid bed, flow rate of fluidizing gases, temperature, etc., and is best determined experimentally.

Both first and second stage decomposers consist of conventional fluidized-bed type reactors, with inlets for solid feed material and fluidizing gases, and outlets for solid and gaseous reaction products as well as fluidizing gases. The decomposers are also equipped with conventional heating means for maintaining the required temperatures. Operating temperatures for the first stage decomposer will range from about 200° to 400° C., with optimum values depending on a variety of factors such as amount, moisture content and particle size of the feed, dimensions of the decomposer, fluid bed density and residence time of the feed in the fluid bed. The temperature, in conjunction with other variables, should be sufficient to result in about 90 to 95 percent decomposition of the $AlCl_3.6H_2O$, according to the above reaction, in the first stage decomposer. Suitable residence times of the $AlCl_3.6H_2O$ in the decomposer are usually about 20 to 40 minutes. This results in substantially improved energy efficiency, as compared to prior art processes, since the major portion of the decomposition in applicants' process takes place at lower temperature where heat losses are much smaller.

The first stage decomposer is operated as a dense fluid bed. Initial fluidization is achieved by means of startup fluidizing gases, preferably a combination of air and steam. As mentioned above, however, the preferred procedure following startup involves utilization of recycle product gases, i.e., HCl and steam, as all or part of the fluidizing gases for the first stage decomposer. Preferably, about 90 to 100 percent of the fluidizing gases will consist of the recycle gases, with the balance consisting of steam which is added for process control. Concentration of HCl in the recycle gases will usually range from about 15 to 40 vol. pct., with concentrations of steam being about 85 to 60 vol. pct. Suitable superficial upward velocity of the fluidizing gases will usually range from about 0.3 to 1.0 m/sec. Residence times of the feed in the first stage decomposer will generally range from about 20 to 40 minutes.

Solid product from the first stage decomposer consists of a mixture of $Al_2O_3$, formed by the above reaction, and about 5 to 10 percent undecomposed $AlCl_3.6H_2O$. This product is transferred by conventional means, such as a pneumatic conveyor, to the second stage decomposer which is also operated as a dense fluidized bed similar to the first stage decomposer. The operating temperature of this stage is, however, much higher than that of the first stage decomposer in order to substantially complete decomposition of the $AlCl_3.6H_2O$ and formation of cell-grade $Al_2O_3$. Temperatures of about 900° to 1100° C. are generally suitable, with optimum values again depending on the above-mentioned variables. Residence times of about 5 to 10 minutes are usually sufficient. Fluidization is achieved by means of conventional fluidizing gases such as combustion products of air and solid, liquid or gaseous fuels, or a mixture of these with steam, oxygen or an inert gas. The combustion products may be formed in a furnace exterior to the decomposer, or a clean fuel such as natural or synthetic gas can be combusted directly in the fluidized bed. Superficial flow velocities similar to those of the first stage decomposer may be used.

The invention will be more specifically illustrated by the following example performed on a laboratory scale. Commercial operations would generally employ substantially larger apparatus.

EXAMPLE $AlCl_3.6H_2O$ feed, of particle size −30 to +325 mesh and water content of about 2–3 wt. pct., was fed to a first stage decomposer at a rate of about 40 g/min. The decomposer consisted of a 4-inch chamber, 18 inches long, of Hastalloy C (nickel-base, corrosion-resistant alloy), electrically heated by a tube bundle comprising nine 500-watt heating elements immersed in a bed. Steam and hydrogen chloride, in a volume ratio of 2:1 and a flow rate of about 0.3 cc/sec. at operating temperature, were used as the fluidizing gas. Operating temperature was 250° C. Residence time of the feed in the decomposer was approximately 30 minutes. The product was removed from the bottom of the fluidized bed by means of a star feeder, and was found to have a chloride content of about 5 wt. percent.

This product was fed to a second stage decomposer similar to the first stage unit, except that the operating temperature was 1000° C. and was maintained by a burner chamber beneath the decomposer chamber. A mixture of carbon dioxide, nitrogen, oxygen and steam in a ratio of about 1:10:1:6 were employed as fluidizing gases at a superficial upward velocity of about 0.4 m/sec. Residence time was approximately 10 minutes. Product, $Al_2O_3$, was again removed from the bottom of the fluidized bed, and was found to have a chloride content of less than 0.1 wt. percent.

We claim:

1. A process for thermal decomposition of aluminum chloride hexahydrate crystals to alumina consisting of:
   (1) treating the aluminum chloride hexahydrate in the form of a dense fluidized bed in a first decomposer at a temperature of about 200° to 400° C. for a period of about 20 to 40 minutes to decompose about 90 to 95 percent of the aluminum chloride hexahydrate to alumina, wherein the gases employed for fluidization of the aluminum chloride hexahydrate in said first decomposer after startup consist of steam and hydrogen chloride from the decomposition of the aluminum chloride hexahydrate in said first decomposer, and
   (2) treating the solid product resulting from step (1), in the form of a dense fluidized bed, in a second decomposer at a temperature of about 900° to 1100° C. for a period of about 5 to 10 minutes to essentially complete decomposition of the aluminum chloride hexahydrate to alumina and recovering said alumina from said fluidized bed.

2. The process of claim 1 in which excess gaseous products from decomposition of the aluminum chloride hexahydrate in the first decomposer are condensed to recover concentrated hydrochloric acid.

* * * * *